(12) United States Patent
Chung

(10) Patent No.: US 11,649,376 B2
(45) Date of Patent: May 16, 2023

(54) CERAMIC PAINT COMPOSITION AND BRAKE DISC PLATE FOR VEHICLE COMPRISING THE SAME

(71) Applicants: Hyundai Motor Company, Seoul (KR); Kia Motors Corporation, Seoul (KR)

(72) Inventor: Eun Young Chung, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 792 days.

(21) Appl. No.: 16/569,173

(22) Filed: Sep. 12, 2019

(65) Prior Publication Data

US 2020/0392372 A1    Dec. 17, 2020

(30) Foreign Application Priority Data

Jun. 14, 2019   (KR) .................. 10-2019-0070997

(51) Int. Cl.
| | | |
|---|---|---|
| C09D 183/04 | (2006.01) | |
| C09D 7/20 | (2018.01) | |
| C09D 5/10 | (2006.01) | |
| C09D 143/04 | (2006.01) | |

(52) U.S. Cl.
CPC ........... *C09D 183/04* (2013.01); *C09D 5/103* (2013.01); *C09D 7/20* (2018.01); *C09D 143/04* (2013.01)

(58) Field of Classification Search
None
See application file for complete search history.

(56) References Cited

U.S. PATENT DOCUMENTS

| | | | |
|---|---|---|---|
| 5,952,444 A | 9/1999 | Ayama | |
| 8,034,456 B2 | 10/2011 | Morishita et al. | |
| 2007/0048531 A1* | 3/2007 | Nagaoka ............... | C08J 7/046 |
| | | | 427/508 |
| 2007/0202324 A2* | 8/2007 | Hawes ................... | B32B 27/08 |
| | | | 428/513 |
| 2012/0058333 A1* | 3/2012 | Yamamoto ........... | C09D 183/04 |
| | | | 524/588 |
| 2013/0266781 A1* | 10/2013 | Hoffmann ............. | F24C 15/10 |
| | | | 427/269 |
| 2013/0302526 A1 | 11/2013 | Fish | |
| 2014/0170437 A1 | 6/2014 | Kim et al. | |
| 2017/0188922 A1* | 7/2017 | Lee ....................... | A61B 5/1486 |

FOREIGN PATENT DOCUMENTS

| | | |
|---|---|---|
| CN | 101300312 A | 11/2008 |
| CN | 101473067 A | 7/2009 |
| CN | 105385334 A | 3/2016 |

(Continued)

OTHER PUBLICATIONS

KR20110014950—English translation (Year: 2011).*

(Continued)

*Primary Examiner* — Stefanie J Cohen
(74) *Attorney, Agent, or Firm* — Fox Rothschild LLP

(57) ABSTRACT

A ceramic paint composition including a polysiloxane, an aluminum oxide, a silicone-based urethane resin, and a solvent component and a brake disc plate for a vehicle including an anticorrosive coated film including the ceramic paint composition are provided.

15 Claims, 1 Drawing Sheet

(56) References Cited

FOREIGN PATENT DOCUMENTS

| | | | |
|---|---|---|---|
| CN | 106752923 A | 5/2017 | |
| CN | 107387611 A | 11/2017 | |
| CN | 108530968 A | 9/2018 | |
| KR | 20110014950 | * | 2/2011 |
| KR | 101290896 B1 | 7/2013 | |
| KR | 201400///36 A | 6/2014 | |
| KR | 2015086081 | * | 7/2015 |

OTHER PUBLICATIONS

KR2015086081—English translation (Year: 2015).*
Chen et al. (2018) "Preparation and Properties of Waterborne Nano-Al2O3/Polysiloxane Hybrid Coatings on Magnesium Alloy for Corrosion Protection", Polymer Materials Science and Engineering, 34(1):112-118.

* cited by examiner

CERAMIC PAINT COMPOSITION AND BRAKE DISC PLATE FOR VEHICLE COMPRISING THE SAME

CROSS-REFERENCE TO RELATED APPLICATION

This application claims the benefit of priority to Korean Patent Application No. 10-2019-0070997, filed in the Korean Intellectual Property Office on Jun. 14, 2019, the entire contents of which are incorporated herein by reference.

TECHNICAL FIELD

The present invention relates to a ceramic paint composition for temporary anticorrosion and a brake disc plate for a vehicle including an anticorrosive coated film including the ceramic paint composition.

BACKGROUND

Each wheel of a disc brake type vehicle is coupled to a brake disc, to rotate with the brake disc. The disc rotating with the wheel is selectively in contact with a brake pad to form frictional force, which is used as braking force to the vehicle. Typically, the brake disc is usually made of cast iron as a main material for ensuring durability against absorption and radiation of heat, which is generated from the brake disc, and friction.

The brake disc made of the cast iron is exposed to air and water in an atmosphere before the vehicle is driven after the vehicle is manufactured and, it takes about 2 to 3 days, or 6 months or longer, for the vehicle to be delivered to a customer after completion of a vehicle assembly. In particular, the vehicle exported to North America and Europe crosses ocean for about two months, resulting in corrosion such as reddish rust on a surface of the brake disc. Rusting the brake disc may cause the customer to be distrustful about performance of the vehicle and may cause complaints. In the related technical field, corrosion of the brake disc is removed by rubbing with the pad for several times braking while the vehicle is running and it is reported that the corrosion does not affect braking performance, which may cause a problem that a squeak is generated between an oxide due to the corrosion and the pad during braking.

In order to solve the above mentioned technical difficulties in the related art, a method of coating a zinc composite film has been introduced, and the method includes forming the zinc composite film on a surface of a basic material; heating the film using radio-frequency curing; and post-treating including painting or coating and drying the film. However, when the composite film formed by the coating method has a coating thickness of 4 μm or less, there is a problem that the corrosion occurs within 10 hours after evaluation of neutral saltwater spray test (SST), and thus anticorrosive performance is insufficient. In addition, because the zinc composite film has low hardness, film loss is large although the number of frictions with the pad due to braking is less than 10 times. Therefore, the anticorrosive performance may not be exhibited until the vehicle is delivered to the customer.

Furthermore, a method of modifying a metal surface for improving corrosion resistance has been reported. The method includes sequentially exposing and fuming the metal surface in an aqueous solution containing sulfur (S) during nitriding or after the nitriding. However, although this method may form a coated film excellent in anticorrosive performance, there is a problem that denaturation of a base material occurs due to oxy-nitriding at high-temperature, or it is not economic.

Accordingly, research and development of an anticorrosive paint composition, which is excellent in anticorrosive performance to effectively prevent corrosion, and simplifies a coating process to be excellent in economic efficiency, a coated film including the anticorrosive paint composition, which is removable during braking more than 70 times, and a brake disc plate including the same is needed.

SUMMARY

In preferred aspects, provided are a ceramic paint composition (e.g., an anticorrosive ceramic paint composition), which is excellent in anticorrosive performance to prevent corrosion occurring on a brake disc plate during a stationary period after a vehicle is manufactured, a coated film including the anticorrosive paint composition, which is removable during braking greater than 70 times, a brake disc plate including the same, and a method of inhibiting corrosion using the same.

The technical problems to be solved by the present inventive concept are not limited to the aforementioned problems, and any other technical problems not mentioned herein will be clearly understood from the following description by those skilled in the art to which the present invention pertains.

In one aspect, provided is an anticorrosive ceramic paint composition for a brake disc plate of a vehicle including a polysiloxane, an aluminum oxide, a silicone-based urethane resin, and a solvent component.

The an anticorrosive ceramic paint composition may suitably include: an amount of about 19 to 43 wt % of the polysiloxane; an amount of about 0.8 to 3.5 wt % of the aluminum oxide; an amount of about 4 to 23 wt % of the silicone-based urethane resin; and an amount of about 38 to 72 wt % of the solvent component, all the wt % based on the total weight of the composition.

Preferably, the polysiloxane may have a weight-average molecular weight of about 8,000 to 15,000 g/mol, a viscosity of about 5 to 50 cps at a temperature of about 25° C., or a glass transition temperature (g) of about −130 to −100° C. The polysiloxane may have a weight-average molecular weight of about 8,000 to 15,000 g/mol, a viscosity of about 5 to 50 cps at a temperature of about 25° C., and a glass transition temperature (Tg) of about −130 to −100° C.

The aluminum oxide may suitably have an average diameter ($D_{50}$) of 400 to 600 nm.

The silicone-based urethane resin may have a weight-average molecular weight of about 5,000 to 10,000 g/mol, a viscosity of about 20 to 60 cps at a temperature of about 25° C., or an unreacted NCO content (NCO %) of about 1 to 5% by weight based on the total weight of the anticorrosive ceramic paint composition. Alternatively, the silicone-based urethane resin may have a weight-average molecular weight of about 5,000 to 10,000 g/mol, a viscosity of about 20 to 60 cps at a temperature of about 25° C., and an unreacted NCO content (NCO %) of about 1 to 5% by weight based on the total weight of the anticorrosive ceramic paint composition.

The term "NCO content (NCO %)" as used herein refers to an isocyanate content in a prepolymer (e.g., urethane resin) or other isocyanate-containing compound, which may be generally measured as the weight percent of unreacted isocyanate groups in that prepolymer or the compound. Particularly, the NCO content may be measured in the silicone-based urethane resin as used herein to determine the unreacted isocyanate groups in the silicone-based urethane prepolymer after the curing.

Preferably, the solvent component may suitably include an organic solvent and water. The organic solvent may suitably include one or more selected from the group consisting of methyl alcohol, ethyl alcohol, benzyl alcohol, isopropyl alcohol, pentyl alcohol, isobutyl alcohol, butyl alcohol, lauryl alcohol, nonyl alcohol, undecyl alcohol, propylene glycol monomethyl ether, and propylene glycol monomethyl ether acetate.

The anticorrosive ceramic paint composition may suitably a viscosity of about 10 to 50 cps at a temperature of about 25° C. and a solid content of about 20 to 40% by weight based on the total weight of the anticorrosive ceramic paint composition.

In one aspect, provided is a brake disc plate for a vehicle including an anticorrosive coated film including the anticorrosive ceramic paint composition as described herein.

The anticorrosive coated film may suitably have an average thickness of about 10 to 40 μm or a pencil hardness of about 6H to 10H. Alternatively, the anticorrosive coated film may suitably have an average thickness of about 10 to 40 μm and a pencil hardness of about 6H to 10H.

The anticorrosive coated film may remain on the brake disc plate when a number of contacts with a brake pad by braking is about 40 times or less.

The brake disc plate may have a neutral salt water corrosion resistance (SST) of about 70 hours or greater measured by a method of JIS K about 560, or a coefficient of friction of about 0.3 to 0.4 with respect to a brake pad. Alternatively, the brake disc plate may have a neutral salt water corrosion resistance (SST) of about 70 hours or greater measured by a method of JIS K about 560, and a coefficient of friction of about 0.3 to 0.4 with respect to a brake pad.

Furthermore, in one aspect, provided is a method of treating a brake disc plate for a vehicle. In other aspect, the method of treating the brake disc plate may include inhibiting corrosion of the brake disk plate. The method may include degreasing the brake disc plate using ultrasonic waves, and coating and curing the anticorrosive ceramic paint composition on the degreased brake disc plate to form an anticorrosive coated film.

Preferably, the degreasing of the brake disc plate using the ultrasonic waves may include immersing the brake disc plate in a water bath at a temperature of about 40 to 50° C. and treating the brake disc plate using the ultrasonic waves having a frequency of about 10 to 100 KHz for about 30 to 60 seconds.

Preferably, the curing of the anticorrosive ceramic paint composition may include treating the anticorrosive ceramic paint composition using a frequency of about 0.5 to 100 kHz at a temperature of about 150 to 230° C. for about 1 to 15 minutes.

Further provided is a vehicle including the brake disc plate as described herein. For example, the brake disc plate may include the anticorrosive coated film and/or anticorrosive ceramic paint composition. In addition, the brake disc plate may be manufactured by a method including the treatment method described herein.

Other aspects of the invention are disclose infra.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
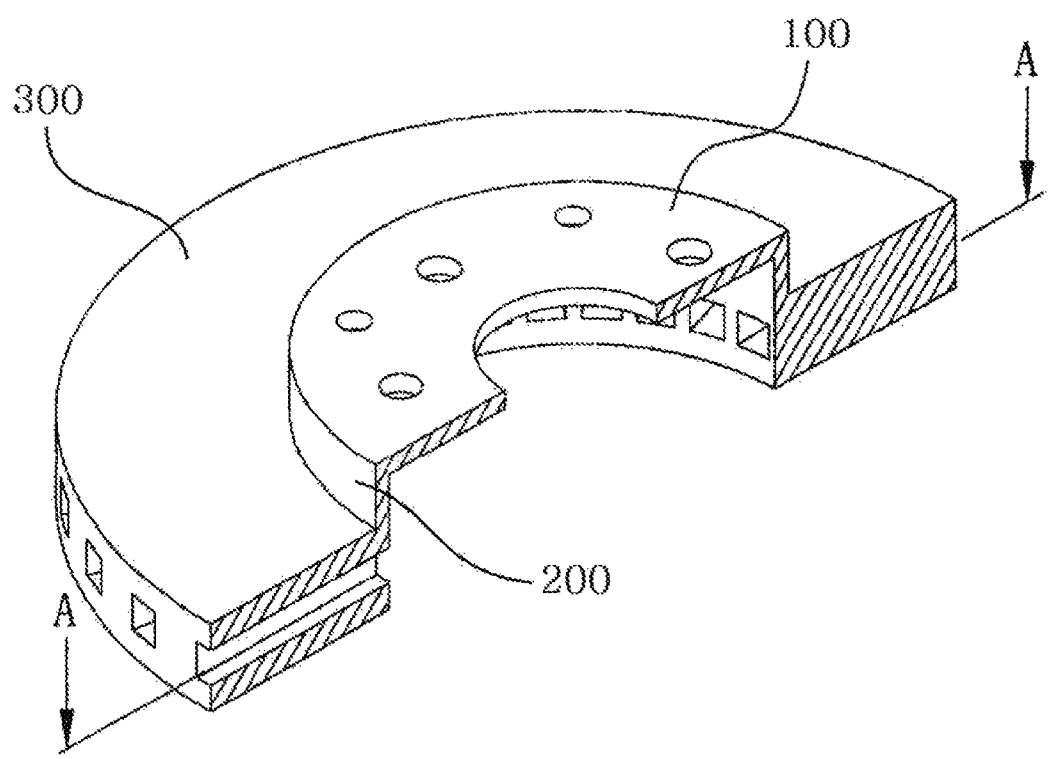
FIG. 1 shows a front view of an exemplary brake disc plate for an exemplary vehicle according to an exemplary embodiment of the present invention.

Hereinafter, the present invention will be described in detail.

In this specification, when a member is located on another member, it includes not only the case where a member is in contact with another member but also the case where another member exists between the two members. The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Ceramic Paint Composition

In an aspect, provided is a ceramic paint composition (e.g., "anticorrosive ceramic paint composition", "ceramic coating paint composition", "ceramic paint composition", "coating paint composition" or "composition") may include: a polysiloxane, an aluminum oxide, a silicone-based urethane resin, and a solvent component.

Polysiloxane

The polysiloxane as used herein may impart abrasion resistance to a coated film to maintain hardness thereof.

The polysiloxane may suitably include one or more of polydimethylsiloxane, polyether-modified polydimethylsiloxane, tetraethyl-ortho-silicate (TEOS), and polymethylalkylsiloxane. Preferably, the polysiloxane may suitably include polydimethylsiloxane and TEOS. The polyether may be, for example, ethylene oxide or propylene oxide. Alkyl of the polymethylalkylsiloxane may be alkyl of 2 to 4 carbon atoms or alkyl of 2 to 3 carbon atoms.

In addition, the polysiloxane may have a weight-average molecular weight (Mw) of about 8,000 to 15,000 g/mol, or about 10,000 to 15,000 g/mol, a viscosity of about 5 to 50 cps, or about 10 to 40 cps at a temperature of about 25° C., and a glass transition temperature Tg of about −130 to −100° C. When the weight-average molecular weight of the polysiloxane is within the above range, the viscosity of the composition may be appropriately maintained and the polysiloxane may be smoothly changed into silicate after bake hardening. When the viscosity is within the above range at the temperature of 25° C., it is advantageous for painting workability, prevention of flow, and ensuring a painting thickness. When the glass transition temperature Tg is within the above range, it is advantageous to secure an appropriate hardness after bake hardening.

Furthermore, the polysiloxane content in the ceramic paint composition may be an amount of about 19 to 43 wt % based on the total weight of the composition. Particularly, the polysiloxane content in the ceramic paint composition may be included an amount of about 20 to 40 wt % based on the total weight of the composition. When the amount of the polysiloxane is less than the above range, for example, less than about 19 wt %, there may be a problem that coating property and flowability of the composition are unsatisfied. When the amount of the polysiloxane is greater than the above range, for example greater than about 43 wt %, the viscosity of the composition may be increased, and thus the coated film may have a non-uniform thickness and a part of the composition coated may be pre-cured to generate a micro-creek.

Aluminum Oxide

The aluminum oxide ($Al_2O_3$) as used herein may reinforce abrasion resistance of the coated film. Therefore, when friction between the brake disc plate and the brake pad, the aluminum oxide prevents the coated film from being damaged to be left during a certain period of the friction.

Here, the aluminum oxide may be in the form of a plate or a sphere. However, the shape and friction characteristics are not significantly related, but a spherical aluminum oxide is economically advantageous.

Preferably, the aluminum oxide may have an average diameter ($D_{50}$) of about 400 to 600 nm, or about 450 to 550 nm. When the average diameter ($D_{50}$) of the aluminum oxide is within the above range, there is an advantageous effect on the abrasion resistance of the coated film. It is difficult to expect the abrasion resistance effect when the average diameter is less than about 400 nm. There is a fear of generation of undesired noise when the brake is operated when the average diameter is greater than about 600 nm.

Furthermore, the aluminum oxide content in the ceramic paint composition may be an amount of about 0.8 to 3.5 wt % based on the total weight of the composition. Particularly, the aluminum oxide content may be an amount of about 1 to 3 wt % based on the total weight of the ceramic paint composition. When the aluminum oxide content is less than about 1 wt %, there is a problem that the coated film has low anticorrosive performance due to the low abrasion resistance. When the amount of the aluminum oxide content is greater than about 3 wt %, the viscosity of the composition increases. Therefore, homogeneity of the thickness of the coated film may be poor, a part of the coated film may be segregated to become a starting point of breakage during the friction, and a part of the coated paint may be pre-baked to cause the micro-creek.

Silicone-Based Urethane Resin

The silicone-based urethane resin as used herein may give an adhesive force to the coated film.

The silicone-based urethane resin may suitably include a silicone-urethane composite resin. Preferably, the silicone-based urethane resin may be a polymer including a silicone-based repeating unit and a urethane-based repeating unit.

Furthermore, the silicone-based urethane resin may be prepared from a composition including a polyol, an isocyanate compound, and a plasticizer. The polyol and isocyanate compound are not particularly limited as long as they are used for producing urethane resin. The plasticizer may be a phthalate-based or non-phthalate-based plasticizer.

In addition, the silicone-based urethane resin may have a weight-average molecular weight (Mw) of about 5,000 to 10,000 g/mol, or about 6,000 to 9,000 g/mol, a viscosity of about 20 to 60 cps or about 30 to 50 cps, at a temperature of about 25° C., and/or a content of unreacted NCO (NCO %) may be about 1 to 5%, or about 2 to 3% by weight based on the total weight of the composition. When the weight-average molecular weight of the silicone-based urethane resin is within the above range, there is an advantageous effect in securing adhesion and maintaining the appropriate viscosity. When the viscosity is within the above range at the temperature of about 25° C., there is an advantageous effect in adjusting a solid content to about 20 to 40% by weight and when NCO % is within the above range, there is an advantageous effect in securing adhesion.

Furthermore, the silicone-based urethane resin content in the ceramic paint composition may an amount of about 4 to 23 wt % based on the total weight of the ceramic paint composition. Particularly, the silicone-based urethane resin content in the ceramic paint composition may be an amount of about of about 5 to 20 wt % based on the total weight of the composition. When the amount of the silicone-based urethane resin is less the above-mentioned range, for example, less than about 4 wt %, there is a problem that the coated film is separated from the brake disc plate due to insufficient adhesion to the brake disc plate. When the amount of the silicone-based urethane resin is greater than the above-mentioned range, for example, greater than about 23 wt %, there is a problem that the hardness of the coated film is insufficient to cause a residual coating amount to be insufficient after a brake operation and to cause the anticorrosive performance and the friction performance to be insufficient.

Solvent Component

The solvent component may adjust the viscosity of the ceramic paint composition to control workability and flowability of the ceramic paint composition.

The solvent component may include an organic solvent and water.

Here, the organic solvent may suitably include at least one selected from of an alcohol-based solvent and an ether-based solvent. Particularly, the organic solvent may suitably include one or more selected from the group consisting of methyl alcohol, ethyl alcohol, benzyl alcohol, isopropyl alcohol, pentyl alcohol, isobutyl alcohol, butyl alcohol, lauryl alcohol, nonyl alcohol, undecyl alcohol, propylene glycol monomethyl ether, and propylene glycol monomethyl ether acetate.

In addition, for example, the water may include deionized water, pure water, ultrapure water, distilled water, and the like.

Furthermore, the solvent component content in the ceramic paint composition may be an amount of about 38 to 72 wt % based on the total weight of the composition. For example, the solvent content may be an amount of about 40 to 70 wt % based on the total weight of the composition. When the amount of the solvent component is within the above range, there is an advantageous effect to maintain the appropriate viscosity of the composition, to maintain an appropriate solid content, to ensure dispersibility in the coating operation, and to suppress viscosity increase due to solvent volatilization.

The solvent component in the ceramic paint composition may include the organic solvent in an amount of about 15 to 60 wt % or an amount of about 20 to 50 wt % based on the total weight of the composition and water in an amount of about 10 to 40 wt % or an amount of about 15 to 30 w % based on the total weight of the composition. When the content of the organic solvent is within the above range, there is an advantageous effect in maintaining the appropriate viscosity and maintaining static solubility with respect to the solid content. When the content of water is within the above range, the composition has an advantageous effect in maintaining appropriate volatilization rate.

Additive

The ceramic paint composition may further include one or more additive selected from the group consisting of a pigment, a dispersant, an anti-settling agent, a thickener, a corrosion inhibitor, a defoamer, and a leveling agent. In addition to the additives as described above, it is possible to additionally include additives which may usually be added to the anticorrosive paint composition.

Here, the additive component content in the ceramic paint composition may be an amount of about 0.1 to 0.5% by weight based on the total weight of the composition. The pigment as used herein may provide color properties such as color appearance parameters in the ceramic paint composition and increase mechanical properties such as the hardness in the coated film formed from the composition. Here, the pigment may include at least one selected from the group consisting of an anticorrosive pigment, a color pigment, and an extender.

The anticorrosive pigment may suitably include a phosphate-based anticorrosive pigment. For example, the phosphate-based anticorrosive pigment may be phosphates of metals, such as aluminum, manganese, zinc, molybdenum, and fluorine, and phosphates of metal oxides, such as hexaammonium and heptamolybdate hydrate.

Furthermore, the color pigment may use various pigments which may exhibit color. For example, iron oxide ($Fe_2O_3$) may be used as the color pigment in terms of coloring, anticorrosion, non-toxicity, stability, water resistance, and chemical resistance.

In addition, the extender may be filled in pores, which are in the coated film, and serves to supplement the hardness and chemical property and to adjust gloss. For example, the extender may include barite, talc, mica, silica, and the like.

The dispersant may serve to prevent the pigment from re-agglomerating, and may include, for example, a silicone-based or non-silicone-based dispersant.

The anti-settling agent as used herein may prevent precipitation of the pigment. Here, the anti-settling agent may be bentonite or fumed silica.

The thickener as used herein may impart film-forming properties to the composition and imparts smoothness to the coated film. The thickener may be, for example, fatty acid amide, polyamide, polyethylene, hydroxypropylcellulose, silicate-based inorganic thickener, and the like.

The corrosion inhibitor as used herein may impart anti-corrosion to the composition, and examples thereof include sodium nitrite, sodium benzoate, and the like.

When bubbles remain in the coated film, poor adhesion to a substrate or deterioration of physical properties may be caused. Thus, the defoamer that prevents defects in the coated film such as the bubbles in the coated film may be added. The defoamer may include, for example, mineral oil type, silicone type, and non-silicone type.

The ceramic paint composition may have the viscosity of about 10 to 50 cps or about 15 to 18 cps at a temperature of about 25° C., and the solid content of about 20 to 40% by weight based on the total weight of the composition. When the viscosity of the ceramic paint composition at the temperature of 25° C. is within the above range, it is advantageous in paint workability. When the solid content is within the above range, it is advantageous in securing the appropriate paint viscosity and securing the appropriate film thickness.

In addition, the ceramic paint composition may be of a sol-gel type. Preferably, the ceramic paint composition may be transferred to a gel type from a sol type through the coating and removing the solvent, and then may be transferred to the coated film made of ceramics through heat treatment.

The ceramic paint composition according to the present invention as described above may provide excellent in anticorrosive performance. Thus, the ceramic paint composition may prevent corrosion from being generated on the brake disc plate during a stationary period after a vehicle is manufactured. The coated film made of the ceramic paint composition may be removable during braking greater than about 70 times and may be suitable for temporary corrosion resistance of the brake disc plate for the vehicle.

Brake Disc Plate for Vehicle

The brake disc plate for the vehicle may include an anticorrosive coated film including the ceramic paint composition as described above.

Figure 2:
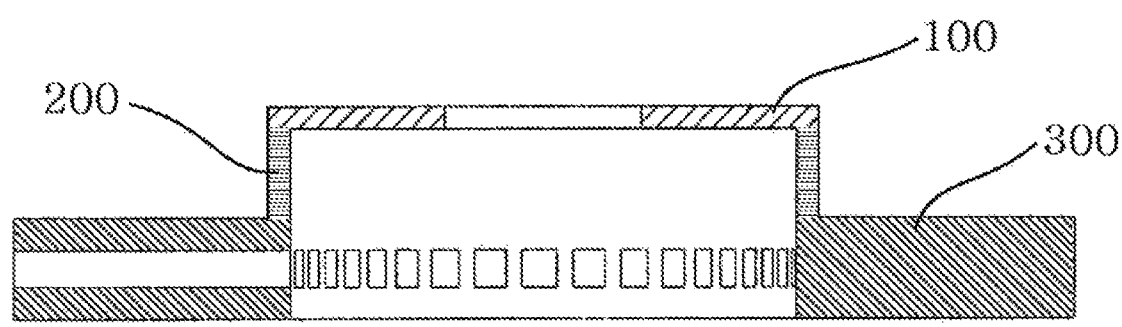
FIG. 2 shows a side view of an exemplary brake disc plate for an exemplary vehicle according to an exemplary embodiment of the present invention.

As shown in FIGS. 1 and 2, the brake disc plate for the vehicle may include a wheel contact 100, a side 200, and a brake pad contact 300. The brake disc plate for the vehicle according to an exemplary embodiment of the present invention may include the anticorrosive coated film including the ceramic paint composition as described above on the wheel contact 100, the side 200, and the brake pad contact 300.

A coated film made of a conventional anticorrosive paint has a friction coefficient between the brake pad and the brake disc plate with the coated film considerably less than a friction coefficient between the brake pad and the brake disc plate before being coated, to lower the braking performance of the vehicle. Therefore, a brushing process for removal of the coated film from the pad contact 300 has been performed. However, because the friction coefficient between the anticorrosive coated film according to various exemplary embodiments of the present invention and the brake pad is appropriate, the braking performance of the vehicle is not reduced. Therefore, there is no need to remove the anticorrosive coated film from the pad contact 300. The vehicle brake disc plate according to various exemplary embodiments of the present invention may include the anticorrosive coated film on an entire plate surface. Therefore, the brake disc plate for the vehicle according to various exemplary embodiments of the present invention may be economical due to a reduction in process cost through simplification of the process.

Here, the anticorrosive coated film may have an average thickness of about 10 to 40 about 15 to 40 or about 20 to 40 and pencil hardness may be 6H to 10H, 7H to 10H, or 8H to 10H.

Furthermore, the anticorrosive coated film may remain on the brake disc plate when the number of contacts with the brake pad for braking is less than about 40 times. For example, the anticorrosive coated film may remain on the brake disc plate when the number of contacts with the brake pad for braking is less than about 50 times. Here, the braking may be decelerated at a deceleration of about 0.1 to 0.5 m/s$^2$, or about 0.2 to 0.4 m/s$^2$ at a speed to about 5 km/h from 50 km/h. The anticorrosive coated film may remain on the brake disc plate even after braking as described above, thereby preventing corrosion from being generated on the brake disc plate.

In addition, the anticorrosive coated film may be removed from the brake disc plate when the number of contacts with the brake pad for braking is more than about 70 times. For example, the braking is the same as described above and the anticorrosive coated film may be removed by braking more than about 70 times. Therefore, the braking performance of the vehicle is not deteriorated.

Furthermore, the brake disc plate may have a neutral salt water corrosion resistance (SST) of about 70 hours or greater or 72 hours or greater measured by a method of JIS K 5600 and may have a friction coefficient with respect to the brake pad of about 0.3 to 0.4, 0.30 to 0.38, or 0.33 to 0.38. The anticorrosive performance of the brake disc plate may be evaluated by the SST of the brake disc plate and the braking performance of the brake disc plate may be evaluated by the friction coefficient against the brake pad. That is, as described above, the brake disc plate includes anticorrosive coated film to have excellent anticorrosive property and good braking property.

Method of Inhibiting Corrosion of Brake Disc Plate for Vehicle

The method of treating the brake disc plate may include a method (e.g., process) of inhibiting corrosion of the brake disc plate. The method may include may include: degreasing the brake disc plate using ultrasonic waves; and coating and curing the ceramic paint composition as described above on the degreased brake disc plate to form the anticorrosive coated film.

Degreasing of Brake Disc Plate Using Ultrasonic Waves

The brake disc plate may be degreased using the ultrasonic waves. The brake disc plate may suitably be degreased with the ultrasonic waves to improve adhesion of the anticorrosive coated film to the brake disc plate.

The degreasing of the brake disc plate with the ultrasonic waves may include immersing the brake disc plate in a water bath at a temperature of about 40 to 50° C. and treating the brake disc plate using the ultrasonic waves of about 10 to 100 KHz for about 30 to 60 seconds. Particularly, the degreasing of the brake disc plate with the ultrasonic waves may include immersing the brake disc plate in the water bath at the temperature of about 40 to 50° C. and treating the brake disc plate using the ultrasonic waves of about 40 to 90 KHz for about 30 to 60 seconds; and drying the ultrasonic treated brake disc plate at about 1 to 20 m/s or 1 to 10 m/s at the temperature of about 40 to 50° C. for about 1 to 5 minutes, or particularly about 1 to 3 minutes.

Manufacturing of Anticorrosive Coated Film

The anticorrosive coated film may be manufactured by coating and curing the ceramic paint composition as described above on the degreased brake disc plate.

As shown in FIGS. 1 and 2, the brake disc plate may include the wheel contact 100, the side 200, and the pad contact 300 and the ceramic paint composition may be coated on the wheel contact 100, the side 200, and the pad contact 300. For example, the anticorrosive coated film may be formed on the wheel contact 100, the side 200, and the pad contact 300.

A coating method is not particularly limited as long as it is a general method of coating paint (e.g., ceramic coating paint), and for example, a coating method using an automatic applicator or a gun may be used. Here, the anticorrosive coated film may have the same thickness as described at the brake disc plate for the vehicle.

In addition, the curing may include treating the coated film using a frequency wavelength of about 0.5 to 100 KHz at a temperature of about 150 to 230° C. for about 1 to 15 minutes. Particularly, the curing may include treating the coated film using the frequency wavelength of about 10 to 80 KHz at the temperature of about 150 to 200° C. for about 5 to 10 minutes. The curing may be carried out using the wavelength as described above and therefore, it is possible to prevent the problem that the adhesion of the coated film is poor due to gas remaining in fine pinholes on the surface of the anticorrosive coated film. When curing is performed using the high frequency as described above, the adhesion of the anticorrosive coated film to the brake disc plate may be improved.

A method of curing the anticorrosive coated film using a conventional high-frequency wave has been performed at a temperature of about 300° C. or greater. However, the curing may be performed at a temperature less than about 250° C. as described above. The curing temperature in the anticorrosive method of the present invention is less than that of the conventional method, and thus the process cost may be reduced, thereby having high economic efficiency.

As described above, the method of inhibiting the corrosion of the brake disc plate for the vehicle according to various exemplary embodiments of the present invention may have less processes of coating than the conventional anticorrosive method where the coating may be performed twice and has the low curing temperature, thereby being excellent in economic efficiency. In addition, the film coated on the pad contact of the brake disc plate using the anticorrosive method according to various exemplary embodiments of the present invention may not reduce the friction coefficient of the brake pad unlike the conventional anticorrosive coated film to omit the brush process where the film coated on the pad contact is cut. Therefore, the process may be simplified.

Hereinafter, the present invention will be described more specifically through examples. However, these examples are provided only for the understanding of the present invention, and the scope of the present invention is not limited to these examples in any sense.

EXAMPLES

Example 1

Production of Ceramic Paint Composition

The ceramic paint compositions were produced by mixing components in amounts shown in Table 1 below.

TABLE 1

| Category (parts by weight) | Polysiloxane | Oxide aluminum | Silicone-based urethane resin | defoamer | Isopropyl alcohol | Water | Total |
|---|---|---|---|---|---|---|---|
| Example 1 | 25 | 2 | 10 | 0.3 | 36.2 | 26.5 | 100 |
| Example 2 | 18 | 2 | 10 | 0.3 | 42 | 27.7 | 100 |
| Example 3 | 45 | 3 | 10 | 0.3 | 25 | 16.7 | 100 |
| Example 4 | 25 | 0.5 | 10 | 0.3 | 37.7 | 26.5 | 100 |
| Example 5 | 25 | 4 | 10 | 0.3 | 36.5 | 24.2 | 100 |
| Example 6 | 25 | 2 | 3 | 0.3 | 39.7 | 30 | 100 |
| Example 7 | 25 | 2 | 25 | 0.3 | 29 | 18.7 | 100 |
| Example 8 | 36 | 2 | 24.5 | 0.5 | 27 | 10 | 100 |
| Example 9 | 16 | 2 | 8.7 | 0.3 | 43 | 30 | 100 |
| Example 10 | 22 | 1.7 | 8 | 0.3 | 39 | 29 | 100 |
| Example 11 | 25 | 2 | 10 | 0.3 | — | 62.7 | 100 |
| Example 12 | 25 | 2 | 10 | 0.3 | 62.7 | — | 100 |
| Comparative Example 1 | — | 2 | 15 | 0.3 | 46.7 | 36 | 100 |
| Comparative Example 2 | 25 | — | 10 | 0.3 | 37.2 | 27.5 | 100 |
| Comparative Example 3 | 25 | 2 | — | 0.3 | 40.2 | 32.5 | 100 |

Physical property, manufacturer and product name of each component used in the comparative examples and the examples are shown in Table 2.

TABLE 2

| Ingredients | Manufacturer & product name | Remarks |
|---|---|---|
| Polysiloxane | Manufacturer: Dow Chemical, Product name: DOWSIL TM 5-7222 LF | Mw: 12,000 g/mol, Viscosity at 25° C.: 25 ± 10 cps, Tg: −110° C. |
| Aluminum oxide | — | Average diameter: 500 nm, Spherical shape |
| Silicone-based urethane resin | Manufacturer: Shinetsu, Product name: KR-311 | Mw: 7,500 g/mol, Viscosity at 25° C.: 40 cps, NCO %: 2.5% by weight |
| Defoamer | Manufacturer: BYK, Product name: BYK-023 | Polysiloxane emulsion |

Test Example 1

Evaluation of Physical Properties of Ceramic Paint Composition and Coated Film The physical properties of ceramic paint compositions of Examples 1 to 12 and Comparative Examples 1 to 3 and the physical properties of coated films were measured by the following methods, and results are shown in Table 3 below.

In detail, the physical properties of the ceramic paint compositions such as curing temperature, solid content and viscosity, were measured by the method described in JIS D 0202. Here, when the viscosity of the composition was 12 cps or greater and less than 17 cps, the evaluation was evaluated as good (○), when the viscosity of the composition was 9 cps or more and less than 12 cps, the evaluation was evaluated as weak (Δ), and when the viscosity of the composition was 17 cps or more and less than 9 cps, the evaluation was evaluated as poor (x).

Further, a brake disc plate (manufacturer: Seo Han Industry, product name: 16-inch DISC made of FCD material) as a basic material, was immersed in a water bath at a temperature of 50° C., was treated with ultrasonic waves of 70 KHz for 45 seconds to be degreased, and was dried by supplying air of 3.5 msec at a temperature of 45° C. after being degreased. Then, the ceramic paint composition was applied on a surface of the degreased base material by a gravity-based gun dry spray method and to have a dry film thickness 40 to 50 μm and a coated film having a thickness of about 20 μm was formed after drying. Then, the coated film was treated with a frequency of 50 KHz for 10 minutes and was cured at a temperature of 175° C. to form an anticorrosive coated film (coated film). Then, the hardness of the anticorrosive coated film was measured by the method described in JIS K 5600. Here, the pencil hardness of 8H or more was evaluated as good (○), the pencil hardness of 6H or more and less than 8H was evaluated as weak (Δ), the pencil hardness of less than 6H was evaluated as poor (x). The thickness of 20 μm or more was evaluated as good (○), the thickness of 15 μm or more and less than 20 μm was evaluated as weak (Δ), the thickness of less than 15 μm was evaluated as poor (x).

TABLE 3

| Item | | Curing temperature (° C.) | Viscosity at 25° C. (cps) | Viscosity | Solid content (w %) | Solid content (v %) | Film thickness (μm) | Film thickness | Pencil hardness | hardness |
|---|---|---|---|---|---|---|---|---|---|---|
| Example | 1 | 175 | 15.0 | ○ | 37 | 26 | 20 | ○ | 8 H | ○ |
| | 2 | 175 | 16.7 | ○ | 30 | 26 | 16.2 | Δ | 6 H | Δ |
| | 3 | 175 | 10.0 | Δ | 58 | 50 | 31.4 | ○ | 10 H | ○ |
| | 4 | 175 | 15.4 | ○ | 35.5 | 31 | 19.2 | Δ | 6 H | Δ |
| | 5 | 175 | 14.5 | Δ | 39 | 34 | 21.1 | ○ | 8 H | ○ |
| | 6 | 175 | 16.7 | ○ | 30 | 26 | 16.2 | Δ | 8 H | ○ |
| | 7 | 175 | 11.4 | Δ | 52 | 45 | 28.1 | ○ | 8 H | ○ |
| | 8 | 175 | 8.9 | X | 62.5 | 54 | 33.8 | ○ | 9 H | ○ |
| | 9 | 175 | 16.8 | ○ | 26.7 | 23 | 14.4 | X | 6 H | Δ |
| | 10 | 175 | 16.3 | ○ | 31.7 | 27 | 17.1 | Δ | 7 H | Δ |
| | 11 | 175 | 16.9 | ○ | 37 | 32 | 20.0 | ○ | 8 H | ○ |
| | 12 | 175 | 11.9 | Δ | 37 | 32 | 20.0 | ○ | 8 H | ○ |
| Comparative example | 1 | 175 | 19.8 | Δ | 17 | 15 | 9.2 | X | HB | X |
| | 2 | 175 | 15.5 | ○ | 35 | 30 | 18.9 | Δ | 6 H | Δ |
| | 3 | 175 | 17.4 | ○ | 25 | 23 | 14.6 | Δ | 8 H | ○ |

As shown in Table 3, the compositions of the Examples had the proper viscosities at a temperature of 25° C. to have excellent workability and the anticorrosive coated film made of the compositions had the excellent pencil hardness.

Test Example 2

Evaluation of Physical Properties of Coated Film

The properties of the brake disc plate having the anticorrosive coated film formed in the same manner as in Test Example 1 were measured in the following methods and results were shown in Table 4 below.

(1) Coefficient of Friction

The coefficient of friction of the brake disc plate was measured using a MODEL 3000 DYNAMOMETER equipment from LINK as a brake friction tester.

The coefficient of friction of 0.33 or more was evaluated as good (○), the coefficient of friction of 0.30 or more and less than 0.33 was evaluated as weak (Δ), and the coefficient of friction of less than 0.30 was evaluated as bad (x).

(2) Crack

Cracking was evaluated based on JIS K 5600-8-4 after the coated film was cured at a temperature of 175° C. for 30 minutes using DSC-HT-202 CHAMBER manufactured by Daesung Leadtech Co.

(3) Adhesiveness

Cutting test was performed using a CROSS CUTTER machine manufactured by Taiyu Japan Co., Ltd. where CROSS CUT was carried according to the method of JIS K 5600-5-6 after adhesion of a tape. The adhesiveness was evaluated as good (○) when cutting area was less than 5%, the adhesiveness was evaluated as weak (Δ) when cutting area was 5% to 10%, and the adhesiveness was evaluated as bad (x) when cutting area was above 10%.

(4) Neutral Saltwater Corrosive Property (SST)

The neutral saltwater corrosive property of the brake disc plate was measured by the method described in JIS K 5600-7-1 using a salt spray tester STP-90V-5 of SUGA, Japan. Specifically, anticorrosive property was evaluated as good (○) when the corrosion occurred after 71 hours or more after spraying the salt water, the anticorrosive property was evaluated as weak (Δ) when the corrosion occurred after more than 48 hours and less than 71 hours, and the anticorrosive property was evaluated as bad (x) when the corrosion occurred after less than 48 hours.

TABLE 4

| Items | | Coefficient of friction | | Crack | | Adhesiveness | | SST(hr) | |
|---|---|---|---|---|---|---|---|---|---|
| Example | 1 | 0.35 | ○ | No | ○ | good | ○ | 100 | ○ |
| | 2 | 0.31 | Δ | No | ○ | good | ○ | 81 | ○ |
| | 3 | 0.35 | ○ | Cracking | X | good | ○ | 157 | ○ |
| | 4 | 0.32 | Δ | No | ○ | good | ○ | 96 | ○ |
| | 5 | 0.34 | ○ | No | ○ | good | ○ | 105 | ○ |
| | 6 | 0.33 | ○ | No | ○ | good | ○ | 81 | ○ |
| | 7 | 0.35 | ○ | No | ○ | good | ○ | 141 | ○ |
| | 8 | 0.35 | ○ | Small cracking | Δ | good | ○ | 169 | ○ |
| | 9 | 0.32 | Δ | No | ○ | good | ○ | 72 | ○ |
| | 10 | 0.32 | Δ | No | ○ | good | ○ | 86 | ○ |
| | 11 | 0.35 | ○ | No | ○ | good | ○ | 100 | ○ |
| | 12 | 0.34 | ○ | No | ○ | good | ○ | 100 | ○ |
| Comparative example | 1 | 0.25 | X | No | ○ | good | ○ | 46 | X |
| | 2 | 0.31 | Δ | No | ○ | good | ○ | 95 | ○ |
| | 3 | 0.34 | ○ | No | ○ | good | ○ | 73 | ○ |

As shown in Table 4, the brake disc plate including the anticorrosive coated film prepared from the compositions of the examples is excellent in the coefficient of friction, the crack, the adhesiveness, the anticorrosive property, and rust resistance.

Test Example 3

Evaluation of Physical Properties

The brake disc plate formed with the anticorrosive coated film prepared in the same manner as in Test Example 1 was braked 50 times at a deceleration of 0.3 m/s² from 50 km to 5 km using a brake dynamometer, and then thickness deviation (Disc Thickness Variation: DTV), run out (R/out), and remaining coated film were measured using a sizer, and results were shown in Table 5 below.

Specifically, a difference between the thickness of the friction surface before braking and the thickness of the friction surface after braking was measured as the thickness deviation (DTV). Parallelism between an inner hub contact surface of the disc and the friction surface which is in contact with the brake pad was measured as the R/out. Here, a residual thickness of the anticorrosive coated film after 50 cycles of braking was measured as the remaining coated film. The thickness of the remaining anticorrosive coated film of 5 μm or more was evaluated as good (○), the thickness of the remaining anticorrosive coated film of 3 μm or more and less than 5 μm was evaluated as weak (Δ), and the thickness of the remaining anticorrosive coated film of less than 3 μm was evaluated as bad (x).

TABLE 5

|  | DTV(μm) | R/out(μm) | Remaining coated film thickness(μm) | |
| --- | --- | --- | --- | --- |
| Example 1 | 4.5 | 21 | 7 | ○ |
| Example 2 | 3.2 | 15.1 | 3 | Δ |
| Example 3 | 8.1 | 37.8 | 17 | ○ |
| Example 4 | 4.5 | 21 | 4 | Δ |
| Example 5 | 4.5 | 19 | 8 | ○ |
| Example 6 | 4.5 | 21 | 5 | ○ |
| Example 7 | 4.5 | 22 | 2 | Δ |
| Example 8 | 6.5 | 30.2 | 12 | ○ |
| Example 9 | 2.9 | 13.5 | 3 | Δ |
| Example 10 | 4.0 | 19.0 | 5 | ○ |
| Example 11 | 4.5 | 20 | 6 | ○ |
| Example 12 | 4.5 | 22 | 5 | ○ |
| Comparative Example 1 | 2.5 | 5 | 0 | X |
| Comparative Example 2 | 3.0 | 11 | 2 | Δ |
| Comparative Example 3 | 3.5 | 23 | 3 | Δ |

As shown in Table 5, the anticorrosive coated film prepared from the examples was suitable for the DTV and the R/out even after braking 50 times, and the anticorrosive coated film remained after the braking, thereby obtaining the anticorrosive effect.

The ceramic paint composition according to various exemplary embodiments of the present invention may be excellent in anticorrosive performance to prevent corrosion on the brake disc plate during the stationary period after the vehicle is manufactured. The coated film formed from the ceramic paint composition may be removable during braking more than 70 times, to be suitable for temporary corrosion resistance of the brake disc plate for the vehicle.

Furthermore, the method of inhibiting the corrosion of the brake disc plate for the vehicle according to various exemplary embodiments of the present invention may have the smaller number of times of coating than the conventional anticorrosive method where the coating is performed twice and the low bake temperature, thereby being excellent in economic efficiency. In addition, the film coated on the pad contact using the anticorrosive method according to various exemplary embodiments of the present invention does not reduce the friction coefficient of the brake pad unlike the conventional anticorrosive coated film to omit the brush process where the film coated on the pad contact is cut. Therefore, the process may be simplified.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. An anticorrosive ceramic paint composition for a brake disc plate of a vehicle, comprising:
   an amount of 19 to 43 wt % of the polysiloxane;
   an amount of 0.8 to 3.5 wt % of the aluminum oxide;
   an amount of 4 to 23 wt % of the silicone-based urethane resin; and
   an amount of 38 to 72 wt % of the solvent component, all the wt % based on the total weight of the composition.

2. The anticorrosive ceramic paint composition of claim 1, wherein the polysiloxane has a weight-average molecular weight of 8,000 to 15,000 g/mol, a viscosity of 5 to 50 cps at a temperature of 25° C., or a glass transition temperature (Tg) of −130 to −100° C.

3. The anticorrosive ceramic paint composition of claim 1, wherein the aluminum oxide has an average diameter ($D_{50}$) of 400 to 600 nm.

4. The anticorrosive ceramic paint composition of claim 1, wherein the silicone-based urethane resin has a weight-average molecular weight of 5,000 to 10,000 g/mol, a viscosity of 20 to 60 cps at a temperature of 25° C., or an unreacted NCO content (NCO %) of 1 to 5% by weight based on the total weight of the ceramic paint composition.

5. The anticorrosive ceramic paint composition of claim 1, wherein the solvent component comprises an organic solvent and water.

6. The anticorrosive ceramic paint composition of claim 5, wherein the organic solvent comprises one or more selected from the group consisting of methyl alcohol, ethyl alcohol, benzyl alcohol, isopropyl alcohol, pentyl alcohol, isobutyl alcohol, butyl alcohol, lauryl alcohol, nonyl alcohol, undecyl alcohol, propylene glycol monomethyl ether, and propylene glycol monomethyl ether acetate.

7. The anticorrosive ceramic paint composition of claim 1, wherein the anticorrosive ceramic paint composition has a viscosity of 10 to 50 cps at a temperature of 25° C. and a solid content of 20 to 40% by weight based on the total weight of the ceramic paint composition.

8. A brake disc plate for a vehicle, comprising an anticorrosive coated film comprising a ceramic paint composition of claim 1.

9. The brake disc plate for the vehicle of claim 8, wherein the anticorrosive coated film has an average thickness of about 10 to 40 μm or a pencil hardness of about 6H to 10H.

10. The brake disc plate for the vehicle of claim 8, wherein the anticorrosive coated film remains on the brake disc plate when a number of contacts with a brake pad by braking is about 40 times or less.

11. The brake disc plate for the vehicle of claim 8, wherein the brake disc plate has a neutral salt water corrosion resistance (SST) of about 70 hours or greater measured by a method of JIS K about 560, or a coefficient of friction of about 0.3 to 0.4 with respect to a brake pad.

12. A method of treating a brake disc plate for a vehicle, comprising:
   degreasing a brake disc plate using ultrasonic waves; and
   coating and curing an anticorrosive ceramic paint composition of claim 1 on the degreased brake disc plate to form an anticorrosive coated film.

13. The method of claim 12, wherein the degreasing of the brake disc plate using the ultrasonic waves comprises immersing the brake disc plate in a water bath at a temperature of about 40 to 50° C. and treating the brake disc plate using the ultrasonic waves having a frequency of about 10 to 100 KHz for about 30 to 60 seconds.

14. The method of claim 12, wherein the curing of the anticorrosive ceramic paint composition comprises treating the anticorrosive ceramic paint composition using a frequency of about 0.5 to 100 kHz at a temperature of about 150 to 230° C. for about 1 to 15 minutes.

15. A vehicle comprising a brake disc plate of claim 8.

* * * * *